United States Patent
Rork et al.

(10) Patent No.: US 8,179,274 B2
(45) Date of Patent: May 15, 2012

(54) CHILD SEAT MONITORING SYSTEM

(75) Inventors: Joseph Paul Rork, Canton, MI (US); Matthew Whitaker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 382 days.

(21) Appl. No.: 12/417,402

(22) Filed: Apr. 2, 2009

(65) Prior Publication Data
US 2010/0253498 A1  Oct. 7, 2010

(51) Int. Cl.
*G08B 21/00* (2006.01)

(52) U.S. Cl. ............. 340/667; 340/438; 340/425.5; 297/468; 297/216.11

(58) Field of Classification Search .......... 340/667, 340/425.5, 438, 666; 297/468, 216.11, 219.12, 297/250.1
See application file for complete search history.

(56) References Cited

U.S. PATENT DOCUMENTS

| | | | |
|---|---|---|---|
| 6,481,750 B1 | 11/2002 | Kalina et al. | |
| 6,535,137 B1 | 3/2003 | Ryan | |
| 6,809,643 B1 * | 10/2004 | Elrod et al. | 340/539.1 |
| 7,100,981 B2 | 9/2006 | Mack et al. | |
| 7,144,042 B2 | 12/2006 | Eichwald | |
| 7,233,239 B2 | 6/2007 | Chitalia et al. | |
| 7,250,869 B2 * | 7/2007 | Davis | 340/573.1 |
| 7,422,283 B2 * | 9/2008 | Patterson et al. | 297/250.1 |
| 7,439,866 B2 * | 10/2008 | Wallner et al. | 340/573.1 |
| 7,796,021 B2 * | 9/2010 | Saban | 340/438 |
| 8,044,782 B2 * | 10/2011 | Saban | 340/438 |
| 2004/0113797 A1 * | 6/2004 | Osborne | 340/573.4 |
| 2005/0092539 A1 * | 5/2005 | Chitalia et al. | 297/216.11 |
| 2005/0280297 A1 * | 12/2005 | Patterson et al. | 297/217.4 |
| 2006/0057900 A1 * | 3/2006 | Lawrence et al. | 439/824 |
| 2009/0051188 A1 | 2/2009 | Foussianes et al. | |
| 2009/0189373 A1 * | 7/2009 | Schramm et al. | 280/731 |
| 2010/0182137 A1 * | 7/2010 | Pryor | 340/425.5 |

FOREIGN PATENT DOCUMENTS
WO   2009 073255 A1   6/2009
* cited by examiner

*Primary Examiner* — Eric M Blount
(74) *Attorney, Agent, or Firm* — Frank A. MacKenzie; Brooks Kushman P.C.

(57) ABSTRACT

A vehicle system for communicating with a child seat is provided with a receiver configured for receiving a seat sensor signal from a child seat controller. A controller is configured for communicating with the receiver for analyzing the seat sensor signal and comparing the seat sensor signal to pre-existing guidelines to determine a status message. A user interface is configured for communicating with the controller for displaying the status message. The child seat is provided with a plurality of seat sensors for measuring different adjustable features of the seat including; a harness sensor for measuring a tension within a harness; a buckle switch for measuring a connection of a buckle; and a level sensor for measuring an inclination of a seat sub-assembly. The seat controller is provided for receiving measurement signals from the seat sensors and transmitting the seat sensor signal.

18 Claims, 5 Drawing Sheets

| SEAT STATUS | | |
|---|---|---|
| FEATURE | STATUS | INSTRUCTION |
| 1. HARNESS | 1. NOK | 1. TIGHTEN HARNESS |
| 2. ANCHOR | 2. OK | 2. --- |
| 3. TETHER | 3. NOK | 3. TIGHTEN TETHER |
| 4. BUCKLE 1 | 4. OK | 4. --- |
| 5. BUCKLE 2 | 5. NOK | 5. CHECK BUCKLE 2 |
| 6. LEVEL | 6. OK | 6. --- |
| 7. DIRECTION | 7. NOK | 7. REVERSE DIRECTION |
| 8. TEMPERATURE | 8. OK | 8. --- |
| 9. MOISTURE | 9. NOK | 9. CHECK COVERING |
| 10. BATTERY | 10. NOK | 10. CHARGE |

CHILD SEAT MONITORING SYSTEM

BACKGROUND

1. Technical Field

One or more embodiments of the present invention generally relate to vehicle child seating and vehicle communications.

2. Background Art

A plurality of adjustable features are provided for conventional child seats for automotive vehicles. The adjustable features allow a user to secure a child to the seat and to secure the seat to the vehicle. Adjustment guidelines are typically provided in a child seat manual. The user adjusts the features of the child seat according to their understanding of the guidelines.

SUMMARY

In at least one embodiment a vehicle system for communicating with a child seat is provided. The vehicle system comprises a receiver. The receiver is configured for receiving at least one seat sensor signal from a child seat controller. The vehicle system further comprises a controller that is configured for communicating with the receiver for analyzing the at least one seat sensor signal and comparing the seat sensor signal to pre-existing guidelines to determine a status message. The vehicle system further comprises a user interface that is configured for communicating with the controller for displaying the status message.

In yet another embodiment a child seat system for use in an automobile is provided. The child seat system comprises a base for resting upon an underlying surface. The system includes a seat sub-assembly for supporting a child; wherein the seat sub-assembly is pivotally connected to the base. The system further comprises a harness for securing a child to the seat sub-assembly. The system includes a harness sensor for measuring a tension within the harness. The system further comprises at least one buckle for connecting multiple portions of the harness together. The system includes a buckle switch for measuring a connection of the buckle. The system further comprises a level sensor for measuring an inclination of the seat sub-assembly. Additionally the system includes a seat controller that is configured for receiving measurement signals from the harness sensor, the buckle switch and the level sensor; wherein the seat controller transmits an information signal indicative of the measurement signals.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims, and/or as a representative basis for teaching one skilled in the art to variously employ the present invention.

In general, a user subjectively adjusts the features of a child seat in a vehicle according to their understanding of the adjustment guidelines for the child seat. Many users are confused by the guidelines and are unsure if they have properly secured the child. A vehicle system is provided whereby sensors take measurements of the adjustable features of the child seat, as the user adjusts the features. A vehicle controller compares the measurements to predetermined guidelines to objectively determine the status of the child seat. The controller then conveys this status to the user, so that the user can properly secure the child.

Figures 1, 8:
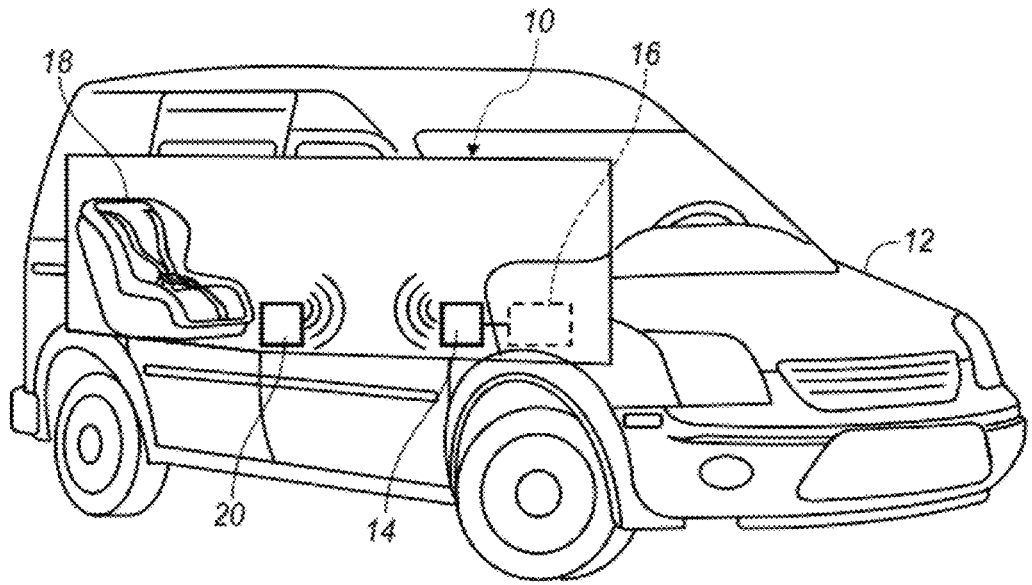
FIG. 1 is a schematic view of a vehicle system for monitoring a child seat system according to embodiments of the present invention.
FIG. 8 is another schematic diagram view of the user interface of the vehicle system of FIG. 1, illustrating a tabular display.

With reference to FIG. 1, a vehicle system for communicating with a child seat system is illustrated in accordance with an embodiment of the present invention and is generally referenced by numeral 10. The vehicle system 10 is depicted within a vehicle 12. The system 10 includes a controller 14 and a user interface 16 that communicate with one another. The controller 14 is configured for communicating with a child seat system 18 for gathering information indicative of a status of the child seat system 18. The controller 14 analyzes the information received from the child seat system 18 and relays a corresponding message to the user interface 16, so that the status of the child seat may be conveyed to an operator of the vehicle 12.

The child seat system 18 includes a seat controller 20 and a plurality of measuring devices for receiving and conditioning information indicative of the status of the seat system 18. The measuring devices take measurements of various features of the seat system 18 and transmit corresponding input signals to the seat controller 20. The seat controller 20 includes signal conditioning equipment (not shown) for modifying any such received signals for analysis. For example, the signal conditioning equipment of the seat controller 20, may include an analog-to-digital converter (not shown), for converting the measured voltage signals into corresponding signals having digital data (e.g. two hexadecimal digits representing eight bits of data).

Figure 2:
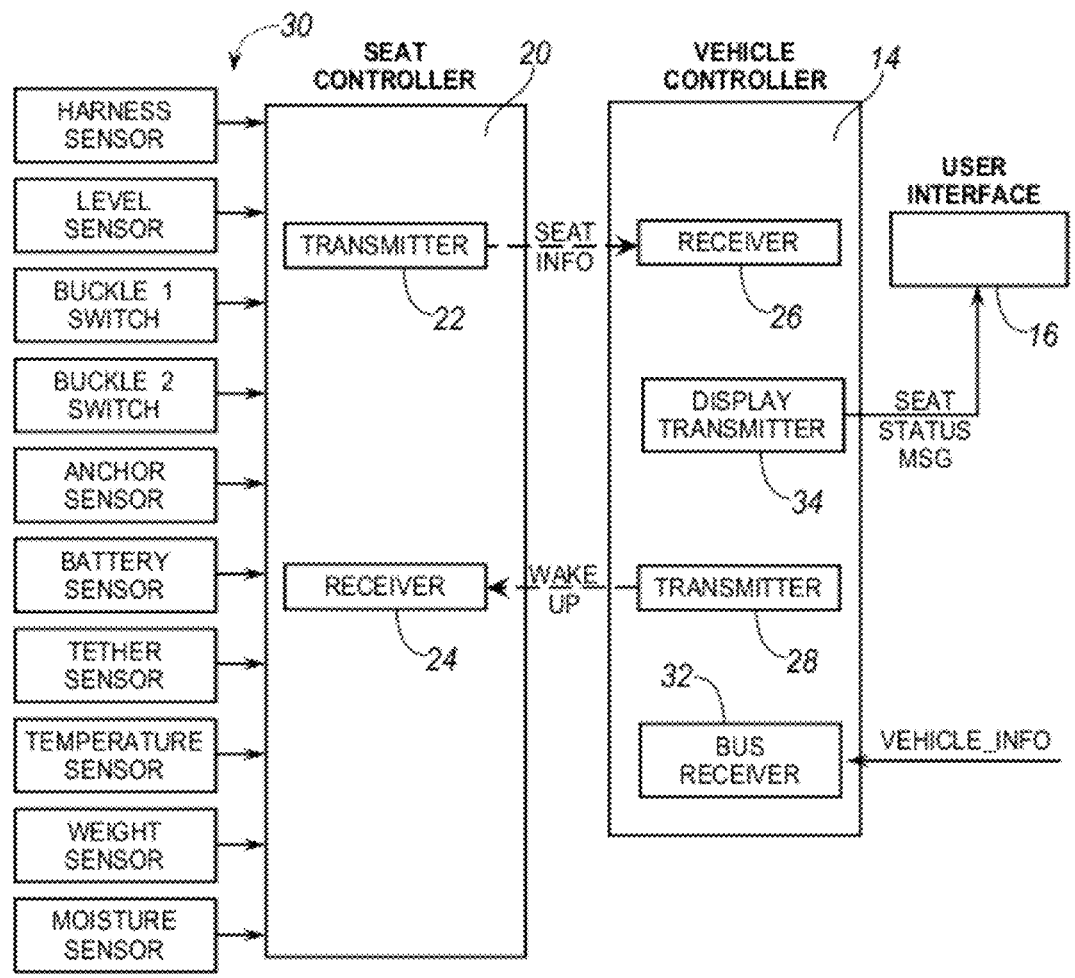
FIG. 2 is a schematic diagram further illustrating the vehicle system of FIG. 1.

With reference to FIG. 2, the vehicle controller 14 and the seat controller 20 communicate with each other using RF communication (as indicated by dashed signal lines). The seat controller 20 includes a seat transmitter 22 and a seat receiver 24 that are configured for communicating with other electronic devices, such as the vehicle controller 14. The seat transmitter 22 transmits signals and the seat receiver 24 receives signals. The vehicle controller 14 includes a receiver 26 and a transmitter 28 that are configured for communicating with other electronic devices, such as the seat controller 20. Both the vehicle controller 14 and the seat controller 20 are configured for communicating with each other via RF waves. Alternate embodiments of the vehicle system 10, contemplate the controllers 14 and 20 communicating over a hardline vehicle connection using a common bus protocol (e.g. CAN). Additional alternate embodiments of the vehicle system 10, envision controllers having transceivers configured for both receiving and transmitting signals.

The vehicle controller 14 and the seat controller 20, generally includes any number of microprocessors, ASICs, ICs, memory (e.g., FLASH, ROM, RAM, EPROM and/or EEPROM) and software code to co-act with one another to perform a series of operations.

The controller 14 may be configured to communicate with a plurality of systems/networks that are external to the vehicle. For example the controller 14 may include transceivers for communicating with satellites (e.g. GPS), and computers (via cellular networks, hardwire connections or radio frequency (RF) waves) (not shown). Such networks are described in detail in co-pending U.S. application 61/005,279 to Pleet et al., which is hereby incorporated by reference.

The vehicle controller 14 may initiate communication with the seat controller 20. The vehicle controller 14 may instruct the transmitter 28 to transmit a WAKE_UP activation signal to the seat receiver 24. Upon receipt of the WAKE_UP signal, the seat controller 20 will "wake up", if the seat controller 20 is presently in a "sleep" mode, by energizing appropriate circuitry. The seat controller 20 prepares a response for the vehicle controller 14 by collecting updated information from the measuring devices of the seat system 18. The measuring devices of the seat system 18 are generally referenced by numeral 30, in FIG. 2. Alternate embodiments of the vehicle system 10 contemplate that the seat controller 20 initiates communication with the vehicle controller 14 by periodically transmitting information or by transmitting whenever the seat controller 20 indicates a state change of one of the measuring devices 30.

The seat controller 20 receives input signals from the measuring devices 30, and transmits corresponding digital data to the vehicle controller 14. Each measuring device 30 provides an input signal to the seat controller 20 that is indicative of the status of a feature measured by the respective device 30. The input signals may be analog or digital signals. The seat controller 20 converts the input signals into corresponding digital data (e.g. eight bits of hexadecimal "hex" data). The seat controller combines the digital data from the measuring devices 30 into a single packet of data, which is generally referred to as SEAT_INFO. The seat controller 20 instructs the seat transmitter 22 to transmit the SEAT_INFO to the receiver 26 of the vehicle controller 14, via RF communication. The SEAT_INFO data is sized according to the desired sensitivity of an application. For example, each input may be converted into a two digit hex value (e.g., A5) representing 8 bits of data, or the input may be converted into a three digit hex value (e.g., AF3), representing 12 bits of data, for more sensitive readings.

The vehicle controller 14 receives the SEAT_INFO data in addition to vehicle data. The receiver 26 is configured to receive the SEAT_INFO from the seat transmitter 22. The vehicle controller 14 also includes a BUS receiver 32 that is configured for receiving hardwired signals from a vehicle BUS communication network (e.g. CAN) containing information indicative of the status of other vehicle systems (VEHICLE_INFO). For example, the VEHICLE_INFO signal received by the controller 14 may include signals indicative of the current angle of inclination of the vehicle 12. Such inclination signals may be measured by vehicle accelerometers (not shown), which are well known in the art. The invention contemplates that the vehicle controller 14 may acquire any signal available on the vehicle BUS for comparison to the SEAT_INFO data.

The vehicle controller 14 compares the SEAT_INFO and VEHICLE_INFO to a set of predetermined data to determine the status of the vehicle seat system 18 and transmits a corresponding status message to the user interface 16. The predetermined data includes acceptable ranges for each measurement made by the measuring devices 30. The vehicle controller 14 determines whether each measurement is within the corresponding acceptable range. The vehicle controller 14 generates an overall seat status message (SEAT_STATUS_MSG). The controller 14 includes a display transmitter 34 for transmitting the SEAT_STATUS_MSG to the user interface 16.

The user interface 16 receives the SEAT_STATUS_MSG and communicates a corresponding message to the operator of the vehicle 12. The message communicated by the user interface 16 may be audio, visual or a combination of both audio and visual messages.

Figure 3:
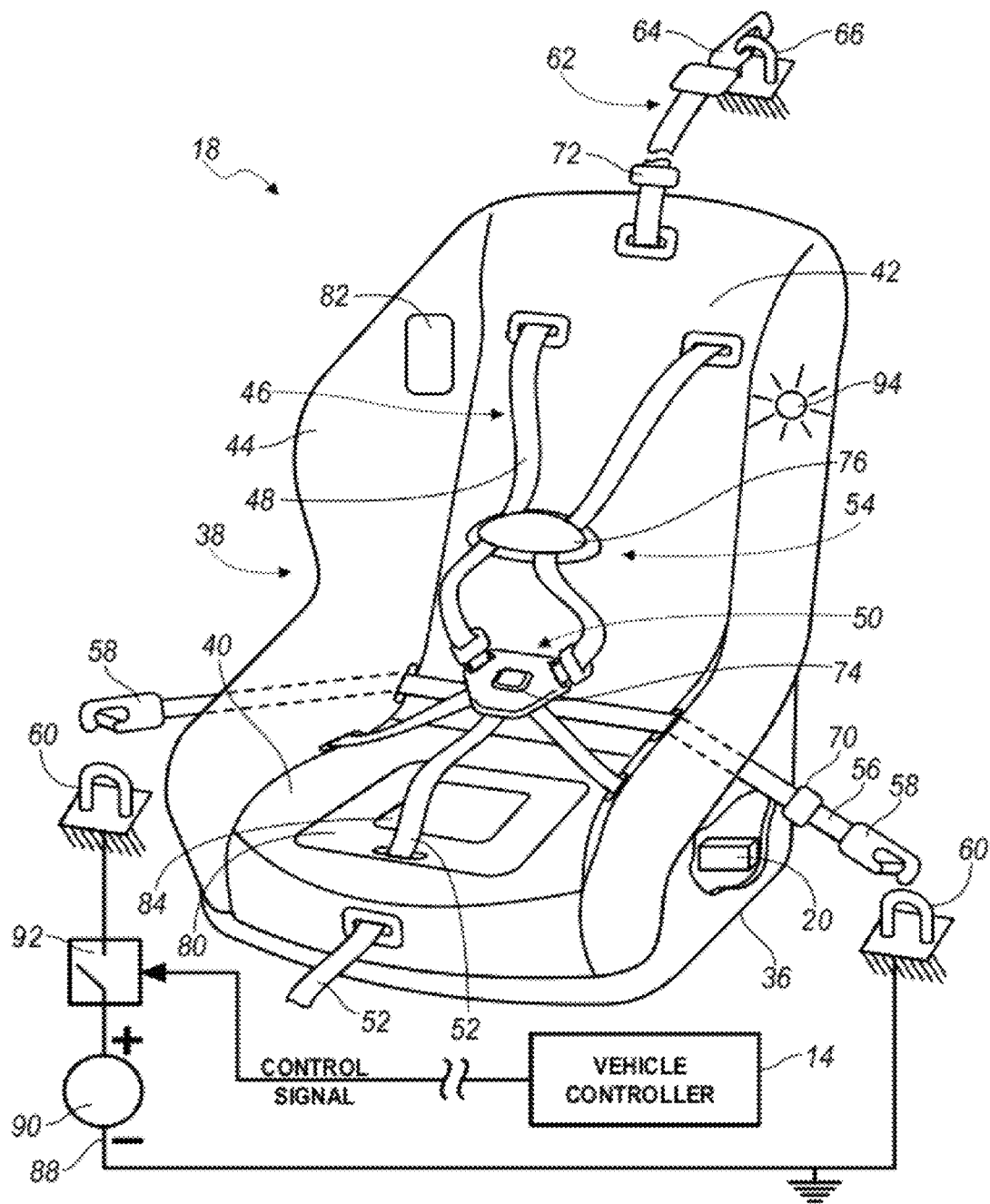
FIG. 3 is a front perspective view of the child seat system of FIG. 1.
Figure 4:
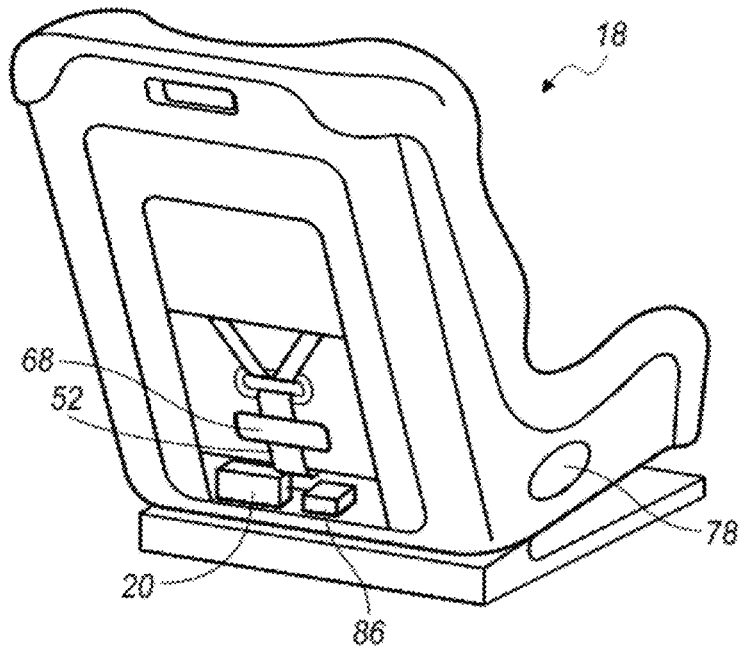
FIG. 4 is a rear perspective view of the child seat system of FIG. 3.

With reference to FIGS. 3-4, the seat system 18 that is depicted includes a base 36 and a seat sub-assembly 38, operatively coupled together for supporting a child (not shown). The base 36 includes a generally planar bottom surface for resting upon a seat of a vehicle 12 (FIG. 1). The seat sub-assembly 38 is formed by a seat bottom 40 and a seat back 42, that are coupled to each other. The seat bottom 40 provides a generally flat surface for a child to sit upon. The seat back 42 provides an upright surface for a child to rest its back upon. The seat sub-assembly 38 includes a padded covering 44 disposed over the seat bottom 40 and the seat back 42.

The seat sub-assembly 38 is pivotally connected to the base 36 for selectively adjusting the seat sub-assembly 38 to a desired angular position. The angular adjustment of the seat system 18 allows the system 18 to be mounted to vehicle seats having varying shapes and sizes. Typical child seat systems 18 are designed such that they may be mounted either in a "forward facing" position (child facing forward in vehicle), or in a "rearward facing" position (child facing rearward in vehicle). The angular adjustment of the seat system 18 allows a seat bottom 40 to be adjusted to a desired angular position in both a forward facing and a rearward facing position.

The child seat system 18 includes a restraint system 46 for securing a child to the seat sub-assembly 38. The restraint system 46 includes a harness 48, such as a five-point harness. The harness 48 includes a plurality of straps that pass through slotted apertures of the covering 44 to connect to each other at a common point. A lap-buckle ("first buckle") 50 provides the common point for connecting the straps of the harness 48. The first buckle 50 is positioned at a lap of the child. The harness 48 includes a pair of generally upright straps, a pair of lap straps and a pull strap 52, each of which are operatively coupled to the first buckle 50. The first buckle 50 is configured such that by pulling/cinching the pull strap 52, the tension throughout the harness 48 increases for securing the child to the seat sub-assembly 38. The seat system 18 also includes a release (not shown) for releasing the tension in the harness 48. A chest buckle 54 ("second buckle") laterally connects the pair of upright straps to each other. The chest buckle 54 is generally positioned at a child's chest.

The restraint system 46 also includes an anchor strap 56 for securely mounting the seat system 18 to a vehicle 12. The anchor strap 56 includes a pair of anchor connectors 58 that are connected to each other by an adjustable strap. The anchor strap 56 laterally extends across a lower portion of the seat back 42 and exits the seat system 18 through a pair of apertures (not shown) positioned on opposing lateral edges of the seat back 42. The anchor connectors 58 are attached/latched to a pair of vehicle anchors 60. The vehicle anchors 60 are rigidly mounted to a structure of the vehicle 12 and extend upwards through a rear seat of the vehicle 12. The anchor strap 56 is tightened/cinched to securely mount the seat system 18 to the vehicle 12.

The restraint system 46 also includes a tether 62 to further secure the seat system 18 to the vehicle 12. The tether 62 includes a tether connector 64 that is connected to an upper portion of the seat sub-assembly 38 by an adjustable strap. The tether connector 64 is attached to a vehicle tether anchor 66. The vehicle tether anchor 66 may be positioned in a plurality of vehicle locations depending on the type of vehicle 12 and direction that the seat system 18 is facing. For example, for a van application where the seat system 18 is facing forward, as depicted in FIG. 1, the vehicle tether anchor 66 may be positioned on the floor of the vehicle behind a row of seats that the seat system 18 is mounted to. Alternate vehicle locations for the tether anchor 66 positions are envisioned and are known in the art.

The seat system 18 includes a plurality of measuring devices 30 for monitoring the status of the components of the seat system 18 and transmitting corresponding signals to the seat controller 20. The measuring devices include, but are not limited to, a harness sensor 68, an anchor sensor 70, a tether sensor 72, a first buckle switch 74, a second buckle switch 76, a level sensor 78, a weight sensor 80, a temperature sensor 82, a moisture sensor 84, and a battery sensor 86. The particular type of measuring device 30 that is implemented may vary based on the desired criteria of a particular implementation. Although specific locations of the measuring devices 30 are described below, alternate embodiments of the seat system 18 contemplate different locations of the devices 30.

The harness sensor 68 is provided for measuring force/tension within the harness 48 as the harness 48 is tightened to secure a child to a seat sub-assembly 38. The harness sensor may be positioned inline along one of the straps of the harness 48. For example, as illustrated in FIG. 4, the harness sensor 68 may be positioned inline along a portion of the pull strap 52 that is connected to both upright straps along a rear portion of the seat sub-assembly 38. The harness sensor 68 transmits an input signal (HARNESS_MSMT) to the seat controller 20 that is indicative of the tension measured in the harness 48. As mentioned above, the straps of the harness 48 are coupled to each other at the first buckle 50, and simultaneously tightened by pulling on the pull strap 52. Therefore, alternate embodiments of the vehicle system 10 envision positioning the harness sensor at alternate locations, inline along the harness 48. Additional alternate embodiments of the harness sensor, contemplate a torque sensor, for measuring a torque value of the harness 48 about the first buckle 50.

The anchor sensor 70 is provided for measuring tension within the anchor strap 56 as the strap 56 is tightened to secure the seat system 18 to the vehicle 12. The anchor sensor 70 may be positioned inline along the anchor strap 56. For example, as illustrated in FIG. 3, the anchor sensor 70 may be positioned external to the seat sub-assembly 38. The anchor sensor 70 transmits an input signal (ANCHOR_MSMT) to the seat controller 20 that is indicative of the tension measured in the anchor strap 56. Alternate embodiments of the vehicle system 10, envision positioning the anchor sensor 70 internal of the seat sub-assembly 38, (e.g., along the portion of the anchor strap 56 that spans the seat back 42).

The tether sensor 72 is provided for measuring tension within the tether 62 as the tether is tightened to secure the seat system 18 to the vehicle 12. The tether sensor 72 may be positioned inline along the strap of the tether 62, as illustrated in FIG. 3. The tether sensor 72 transmits an input signal (TETHER_MSMT) to the seat controller 20 that is indicative of the tension measured along the strap of the tether 62.

The first buckle switch 74 is provided for measuring continuity within the first buckle 50, which is used to secure a child to a seat sub-assembly 38. The first buckle switch 74 may be positioned within the first buckle 50. The first buckle switch 74 transmits an input signal (Buckle_1_MSMT) to the seat controller 20 that is indicative of the continuity within the first buckle 50. For example, when the first buckle 50 is connected, the switch 74 may transmit a "high" analog voltage signal, such as 4.5-5.0 Volts. Conversely when the first buckle 50 is not connected the switch 74 may transmit a "low" analog voltage signal, such as 0.0-0.5 Volts. Alternate embodiments of the vehicle system 10 contemplate using a sensor rather than a switch 74 for indicating whether or not the first buckle 50 is connected.

The second buckle switch 76 is provided for measuring continuity within the second buckle 54, which is used to secure a child to a seat sub-assembly 38. The second switch 76 may be positioned within the second buckle 54. The second buckle switch 76 transmits an input signal (Buckle_2_MSMT) to the seat controller 20 that is indicative of the continuity within the second buckle 54. Alternate embodiments of the vehicle system 10 envision using a sensor rather than a switch 76 for indicating whether or not the second buckle 54 is connected.

The level sensor 78 is provided for measuring an angle of inclination of the seat sub-assembly 38 relative to ground. The level sensor 78 may be positioned on the side of the base 36, as illustrated in FIG. 4. The level sensor 78 transmits an input signal (LEVEL_MSMT) to the seat controller 20 that is indicative of the angle of inclination of the seat sub-assembly 38. An embodiment of the level sensor 78 includes a dual axis accelerometer.

The weight sensor 80 is provided for measuring a weight of a child that is secured to the seat sub-assembly 38. The weight sensor 80 may be positioned within the covering 44 that is disposed over the seat bottom 40 as illustrated in FIG. 3. The weight sensor 80 transmits an input signal (WEIGHT_MSMT) indicative of the weight of the child.

The temperature sensor 82 is provided for measuring a temperature at a location of the seat system 18. The temperature sensor 82 may be positioned on an upper portion of the seat back 42 as illustrated in FIG. 3. The temperature sensor 82 transmits an input signal (TEMP_MSMT) to the seat controller 20 that is indicative of the temperature measured by the sensor 82. Alternate embodiments of the seat system 18 contemplate a seat sub-assembly having a cup holder (not shown). For such an embodiment a temperature sensor may be positioned within the cup holder for measuring a temperature that is indicative of the temperature of a fluid within a child's cup.

The moisture sensor 84 is provided for measuring a moisture level at a location of the seat sub-assembly 38. The moisture sensor 84 may be positioned within the covering 44 that is disposed over the seat bottom 40 as illustrated in FIG. 3. The moisture sensor 84 transmits an input signal (MOISTURE_MSMT) to the seat controller that is indicative of the moisture level that is measured by the sensor 84.

The battery sensor 86 is provided for measuring an electrical power level of a seat controller battery (not shown). The battery sensor 86 may be positioned within or in proximity to the seat controller 20, as illustrated in FIG. 4. The battery sensor 86 transmits a signal (BATTERY_MSMT) to the seat controller 20 that is indicative of the electrical power of the battery. One embodiment of the battery sensor envisions a sensor for measuring the voltage potential of the battery. Another embodiment of the battery sensor contemplates a sensor for measuring the current level stored in the battery. For example a current shunt or an inductive current clamp may be used for measuring the current level in the battery.

As mentioned above the seat controller 20 includes the seat system battery for providing electrical power to the seat system 18. The seat system battery may include a single use (disposable) battery, or a rechargeable battery.

An embodiment of the seat controller 20 includes a MOTE controller. A MOTE is generally an inexpensive controller, capable of sensory collection, basic processing, and wireless communication, that consumes a low amount of electrical power. Therefore the MOTE may operate for a prolonged period of time with a disposable battery or on a single battery charge.

Referring to FIG. 3, the seat controller 20 may include a rechargeable battery that is charged by the vehicle. An embodiment of the vehicle system 10 includes a charging circuit 88 for charging the seat controller battery. The circuit 88 includes a power supply 90 and a switch 92. The power supply 90 may be the vehicle battery. The switch 92 is provided for controlling the direction of current flow within the charging circuit 88. The vehicle controller 14 may be hardwired connected to the switch 92, such that the vehicle controller 14 may selectively transmits a signal (CONTROL_SIGNAL) to the switch 92 to command the switch to open or close, thereby altering the direction of the current flow within the circuit 88. A seat circuit (not shown) may be formed by the anchor strap 56, the vehicle anchors 60 and the seat battery. The anchor strap 56 may include a wire harness (not shown), embedded in the strap, that extends from an anchor connector 58 through the seat battery and continues to the other anchor connector 58. Thus when the anchor connectors 58 are both attached to the corresponding vehicle anchors 60, the vehicle controller 14 may selectively close the switch 92, thereby allowing current to flow from the charging circuit 88 to the seat circuit to charge the seat battery.

An alternate embodiment of the charging circuit envisions a circuit that inductively charges the seat battery. The charging circuit is placed in proximity to the seat battery, such as within a rear seat of the vehicle 12. The charging circuit may be activated by the vehicle controller to generate an electromagnetic field that inductively charges the seat battery.

The seat system 18 may also include an environmental lighting device 94 that is capable of emitting different colors depending on the vehicle application. As mentioned above, the vehicle controller 14 receives vehicle information (VEHICLE_INFO) from the vehicle BUS. This VEHICLE_INFO may include information regarding an interior lighting color or trim color of the vehicle 12. Additionally as mentioned above the vehicle controller 14 transmits information (e.g., the WAKE_UP signal) to the seat controller 20. The vehicle controller 14 may also transmit information regarding an interior lighting color or trim color to the seat controller 20, which may be used by the seat controller 20 to adjust the environmental lighting device 94. Alternate embodiments of the vehicle system 10 envision the user selecting a color to be emitted by the lighting device 94 through the user interface 16.

Figure 5:
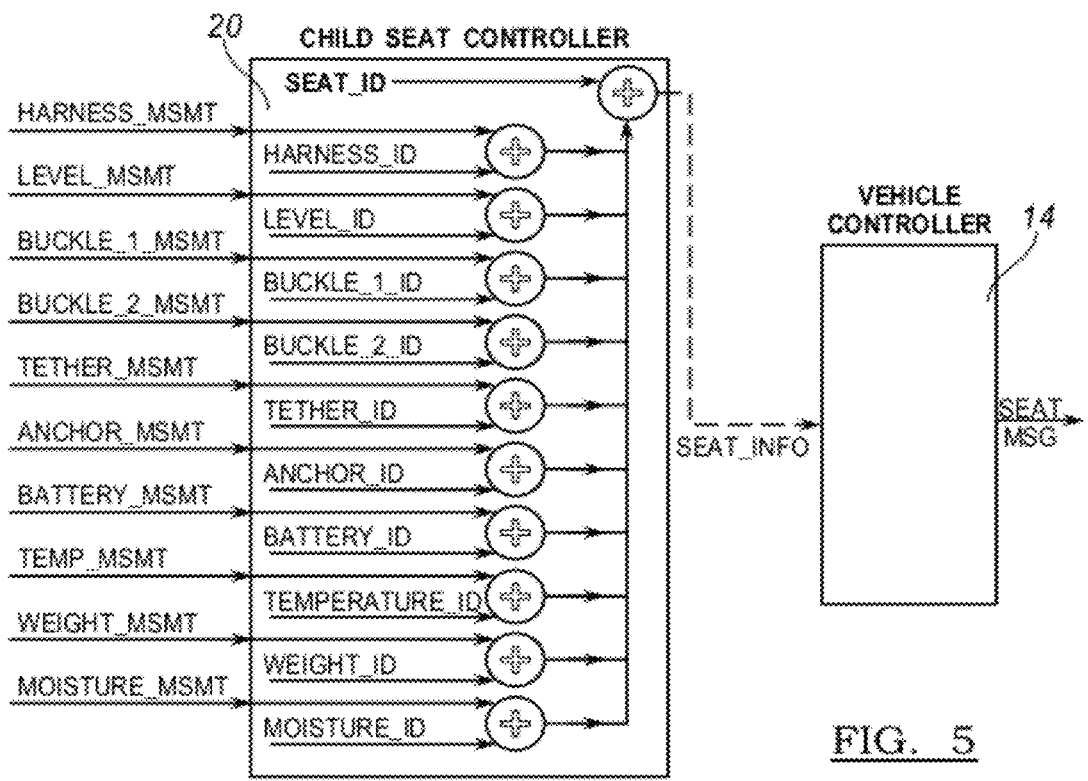
FIG. 5 is another schematic diagram illustrating the vehicle system of FIG. 1.

Referring to FIG. 5, the seat controller 20 receives a plurality of input voltage signals and converts them into a packet of digital data. Additionally the seat system 18 and each measuring device 30 include a identification tag that is also included in the packet of digital data. The identification tags identify a specific seat system 18, having specific measuring devices 30, within a vehicle 12. By identifying the system 18 the vehicle controller 14 can compare the measurements taken by a seat system 18 against predetermined data that was configured for that specific seat system 18.

For example a seat system 18 may have a digital identification tag (SEAT_ID) of A1. A harness sensor 68 may include a digital identification (HARNESS_ID) of B2. The harness sensor 68 may measure a harness tension of 3.2 volts, which the seat controller 20 digitizes into a corresponding value of C3. The seat controller may group this digital data into a packet (SEAT_INFO). Of course, the SEAT_INFO signal can also include ID tags and measurements from the other measuring devices 30. The SEAT_INFO signal that is sent by the seat controller 20 and received by the vehicle controller 14 may be an RF signal corresponding to a signal of A1B2C3.

Upon receipt of the SEAT_INFO signal the vehicle controller 14 analyzes the data, and transmits a corresponding SEAT_STATUS_MSG to the user interface 16.

Figure 6:
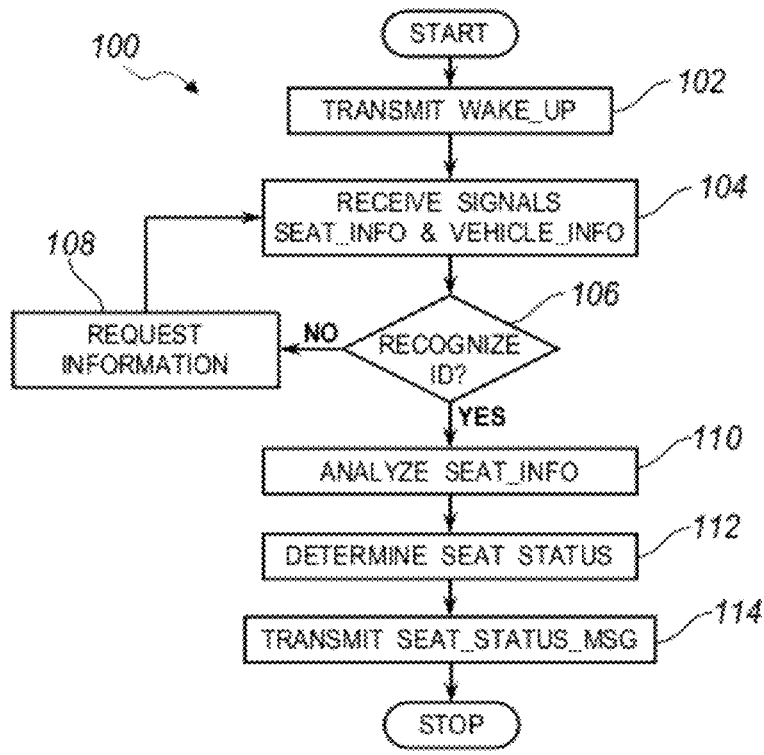
FIG. 6 is a flow chart illustrating a method for monitoring the child seat system of FIG. 1.

FIG. 6 illustrates a method 100 for evaluating the status of the vehicle seat system 18. The vehicle controller 14 generally includes any number of microprocessors, ASICs, ICs, memory (e.g., FLASH, ROM, RAM, EPROM and/or EEPROM) which co-act with software code to perform the operations of the method 100.

In operation 102, the vehicle controller 14 transmits a WAKE_UP signal to the seat controller 20. Upon receipt of the WAKE_UP signal the seat controller 20 energizes appropriate circuitry to collect measurements from the corresponding measuring devices 30.

In operation 104, the vehicle controller 14 receives the SEAT_INFO signal from the seat controller 20 and the VEHICLE_INFO from the vehicle BUS. The SEAT_INFO signal includes the identification tags for the seat system 18 (SEAT_ID) and each measuring device 30, as well as signals indicative of the measurements made by each measuring device 30.

In operation 106 the vehicle controller 14 determines whether or not the controller recognizes a SEAT_ID and corresponding identification tags for the measuring devices 30.

In operation 108 if the vehicle controller 14 determines that it did not recognize an identification tag, the controller 14 may request information. The controller 14 may request the information via an external network (e.g., via a cell phone network). Alternatively the controller 14 may request the information from the operator of the vehicle, via the user interface 16.

In operation 110, once the vehicle controller 14 recognizes the identification tags of a seat system 18, then the controller 14 analyzes the measured values included in the SEAT_INFO. The controller locates a predetermined acceptable range for a particular measurement and compares the measured value to the range. For example, for a particular harness sensor 68, the predetermined data may indicate that the acceptable range for a harness tension is between ten Newtons and twenty Newtons which may correspond to a digital range of C1-C9. The vehicle controller 14 compares a measured harness tension value of C3 (from the digitized data representing the HARNESS_MSMT) to the acceptable range to determine that the status of the harness 48 is within the range and therefore acceptable.

For some measurements (e.g., angle of inclination of the seat sub-assembly 38) the vehicle controller 14 references information from the VEHICLE_INFO in its analysis of the SEAT_INFO. For example the vehicle controller 14 may compare the LEVEL_MSMT indicating the angle of inclination of the seat sub-assembly 38 to measurements made by vehicle accelerometers to determine whether the seat sub-assembly 38 is facing forward or rearward.

Additionally, the vehicle controller 14 may analyze multiple measurements from the SEAT_INFO together to determine the status of a feature of the seat system 18. For example, infants are typically seated in a car seat sub-assembly 38 that is facing rearward. The guidelines for when to switch the child to a forward facing seat may be based on the weight of the child (e.g., once the child exceeds 20 pounds (lbs)). The controller 14 might compare the weight of the child (from the digitized data representing the WEIGHT_MSMT) to the direction the child is facing (determined above) to determine whether or not the child is facing in the proper direction. In another embodiment the vehicle controller 14 monitors signals to confirm the seat sub-assembly 38 is currently unoccupied by a child before charging the seat battery via the charging circuit 88. For example, the vehicle controller may determine that the seat is not occupied by analyzing the digital data representing the WEIGHT_MSMT.

In operation 112 the vehicle controller 14 determines from the analysis in operation 110 an overall status of the seat system 18. The overall status includes, but is not limited to, whether the harness 48, the anchor strap 56 and the tether 62 are tightened to a proper tension; whether the first buckle 50 and the second buckle 54 are connected; whether the seat sub-assembly 38 is adjusted to the proper angular inclination; whether the child is facing the proper direction; whether the temperature is acceptable; whether the covering 44 is moist; and the power level of the seat battery.

In operation 114 the vehicle controller 14 transmits the SEAT_STATUS_MSG to the user interface 16.

Figure 7:
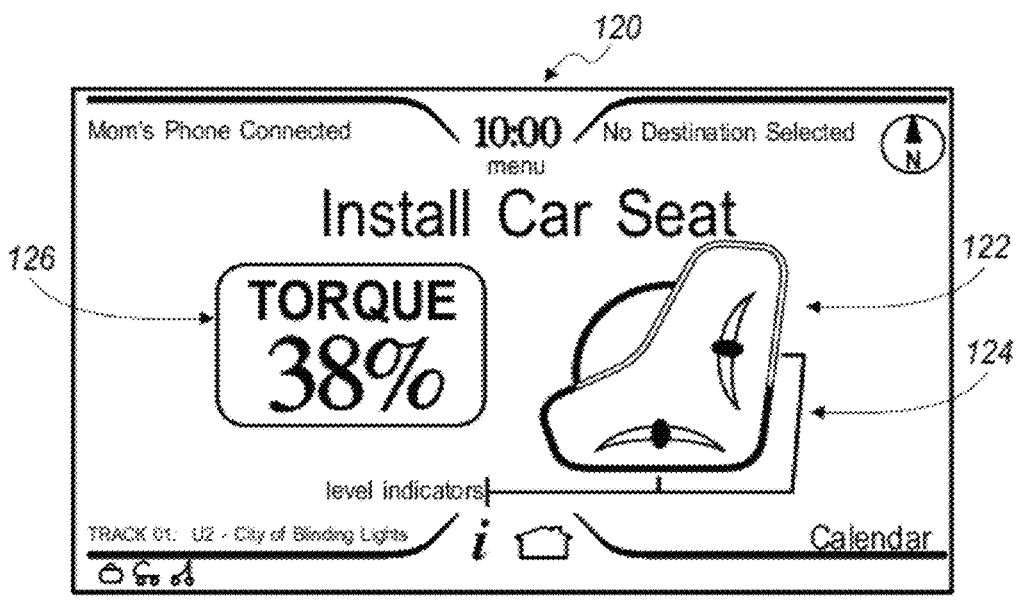
FIG. 7 is a schematic diagram of a user interface of the vehicle system of FIG. 1, illustrating a pictorial display.

With reference to FIGS. 7-8, the user interface 16 displays the seat system 18 status information to the operator of the vehicle 12.

FIG. 7 illustrates a pictorial display 120 of the status of the seat system 18 as displayed by the user interface 16. The display 120 includes a seat image 122 representing the seat system 18. The display 120 may include the status of multiple features of the seat system 18, or each feature individually. For example, as illustrated in FIG. 7, the current status of an individual feature, the tension of the harness 48, may be conveyed to the user. The status may be conveyed graphically by level indicators 124. Additionally this status may be conveyed to the user numerically by the numerical icon 126 illustrating "Tension/Torque thirty-eight percent". Alternate embodiments of the user interface 16 contemplate an audio component in addition to the display. For example, the user may be in the rear of the vehicle adjusting the seat system 18. The user interface 16 may be difficult to see from the rear of the vehicle, however the user may listen to the audio status as feedback to their adjustment of the seat system 18.

FIG. 8 illustrates a tabular display 130 indicating the status of multiple features of the seat system 18 simultaneously. The display 130 includes a feature column 132 listing the features that were analyzed. A status column 134 indicates whether each analyzed feature is "OK" or not OK "NOK". An instruction column 136 instructs the user how they may adjust a particular feature.

While the best mode for carrying out the invention has been described in detail, those familiar with the art to which this invention relates will recognize various alternative designs and embodiments for practicing the invention as defined by the following claims. Additionally, the features of various implementing embodiments may be combined to form further embodiments of the invention.

What is claimed:

1. A vehicle system comprising:
   a receiver for receiving at least one seat sensor signal from a child seat controller;
   a transmitter for providing output to the child seat controller;
   a controller communicating with the receiver and transmitter for analyzing the at least one seat sensor signal and comparing the seat sensor signal to pre-existing guidelines to determine a status message; and
   a user interface communicating with the controller for displaying the status message;
   wherein the controller is configured to:
      receive a seat identification signal indicative of an identification of a child seat,
      compare the seat identification signal to pre-existing guidelines to determine if the child seat is recognized, and
      request information for the child seat using an external network if the controller determines that the child seat is not recognized.

2. The vehicle system of claim 1, wherein the receiver is configured to receive the at least one seat sensor signal from a wireless transmitter.

3. The vehicle system of claim 1, wherein the transmitter is configured for transmitting an activation signal to the child seat for initiating communication between the vehicle system and the child seat controller.

4. The vehicle system of claim 1, wherein the controller further comprises a network receiver for receiving vehicle information from a vehicle communication network.

5. The vehicle system of claim 1, wherein the seat sensor signal includes at least one harness tension component for indicating a tension within a portion of a child restraint harness.

6. The vehicle system of claim 1, wherein the seat sensor signal includes at least one buckle component for indicating a connection of a buckle that is connected to a child restraint harness.

7. The vehicle system of claim 4, wherein the seat sensor signal includes a level component for indicating an angular inclination of the child seat.

8. The vehicle system of claim 1, wherein the seat sensor signal includes a tether component for indicating a tension within a portion of a tether extending from the child seat to the vehicle.

9. The vehicle system of claim 7, wherein the controller compares the level component to the vehicle information to determine a seat direction of the child seat.

10. A vehicle system comprising:
    a controller configured to:
       receive at least one seat sensor signal from a child seat controller, the seat sensor signal including a battery component for indicating a status of a child seat battery, and
       compare the seat sensor signal to pre-existing guidelines to determine a status message,
    a user interface communicating with the controller for displaying the status message; and
    a charging circuit for charging the child seat battery.

11. The vehicle system of claim 10, further comprising a seat circuit formed by an anchor strap and the child seat battery, wherein the seat circuit directly connects to the charging circuit at a pair of vehicle anchors for charging the child seat battery.

12. The vehicle system of claim 10, wherein the charging circuit is positioned in proximity to the child seat such that the child seat battery may be inductively charged by a field emanating from the charging circuit.

13. The vehicle system of claim 10, wherein the controller selectively charges the child seat battery when the controller determines that the child seat is not occupied.

14. The vehicle system of claim 1, wherein the user interface further comprises a pictorial display for displaying the status message.

15. The vehicle system of claim 3 wherein the transmitter also transmits vehicle information to the child seat; and wherein the seat controller adjusts a lighting device of the child seat in response to the vehicle information.

16. The vehicle system of claim 14, wherein the user interface further comprises an audio component for conveying the status message to the user audibly.

17. The vehicle system of claim 1, further comprising a child seat for initiating communication with the controller upon detection of a change in the seat sensor signal.

18. A vehicle system for monitoring the status of a child seat and communicating the status to a user, the vehicle system comprising:

a controller configured to:
    receive a seat identification signal indicative of the identification of a child seat, a harness signal indicative of a measurement of a tension within a harness of the child seat, a level signal indicative of a measurement of an angular inclination of the child seat, and a buckle signal indicative of a measurement of a buckle connection of the child seat,
    compare the seat identification signal to pre-existing guidelines to determine if the child seat is recognized,
    request information for the child seat using an external network if the controller determines that the child seat is not recognized, and
    control a user interface to display a seat status message that is generated based on a comparison of the seat identification signal, the harness signal, the level signal and the buckle signal to pre-existing guidelines.

\* \* \* \* \*